United States Patent Office 3,204,923
Patented Sept. 7, 1965

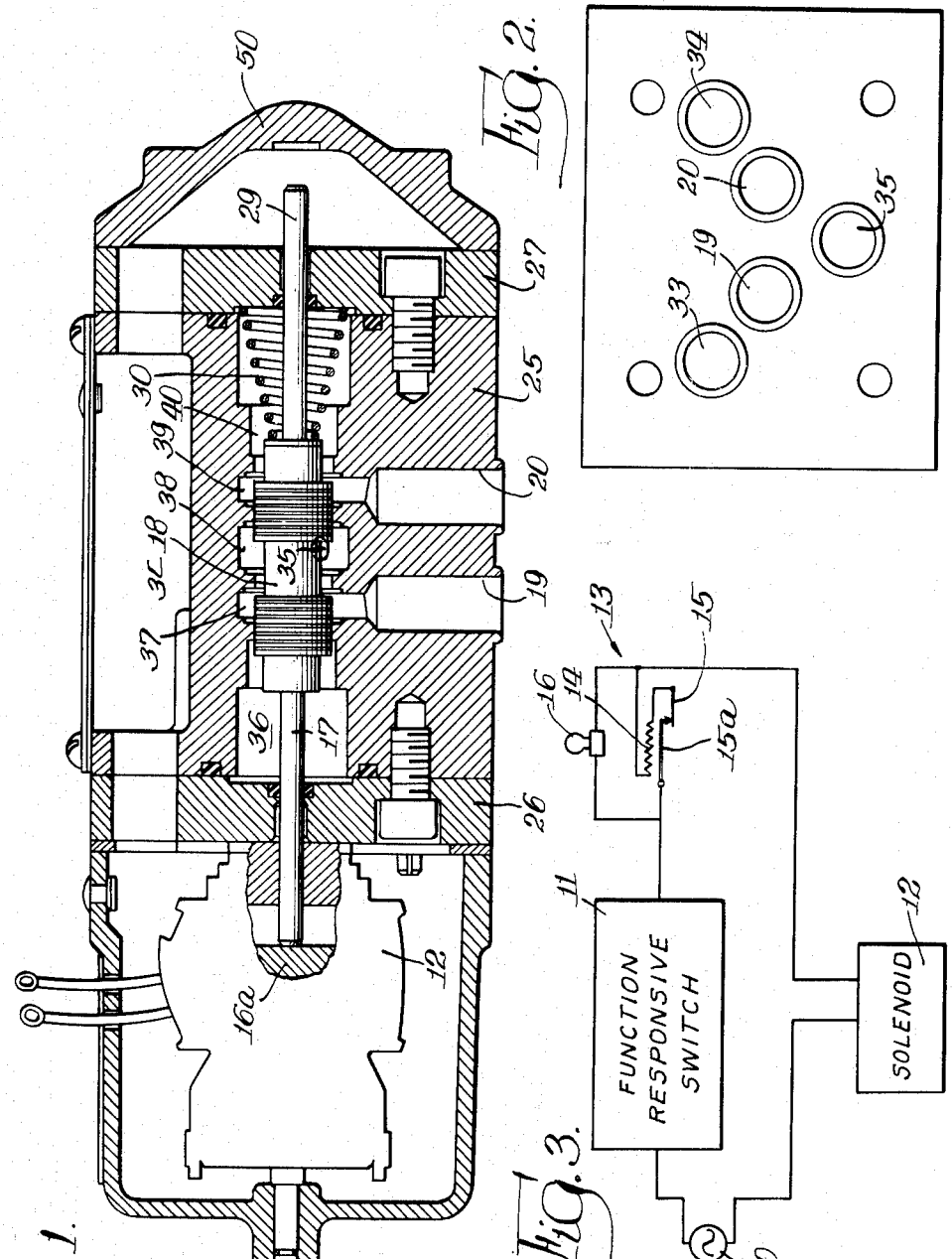

3,204,923
SOLENOID VALVE
Robert D. Rynders and William R. Dollase, Racine, Wis., assignors to Racine Hydraulics & Machinery, Inc., a corporation of Wisconsin
Filed July 23, 1962, Ser. No. 211,662
8 Claims. (Cl. 251—129)

This invention relates to an improved solenoid valve, and, more particularly, to a solenoid valve and circuit that assists in obtaining proper operation of the valve.

Solenoid valves generally include a solenoid driving the stem of a valve member to perform the valving function, and are adapted to be remotely energized to control the fluid flow. A problem often encountered in such valves is one in which the valve member does not properly move to control position due to material particles in the fluid with the result that the plunger of the solenoid does not complete its travel. When this occurs, burn out current in excess of a holding current flows through the solenoid, and if not interrupted in some manner, may well burn out the solenoid.

It is, therefore, an object of this invention to provide a new and improved solenoid valve.

It is a further object of this invention to provide an improved solenoid valve which automatically reactuates when the valve is not completely closed.

It is still a further object of this invention to provide a protective circuit for a solenoid valve.

Accordingly, one feature of the invention is to provide a solenoid control valve including a casing, a valve member movable in the casing to control fluid flow, a solenoid operatively connected to the valve member for moving the valve member to a control position, circuit means for energizing the solenoid, and means responsive to a continuation of a burn out current value caused by the valve member not reaching the control position after a predetermined time for recycling the solenoid.

It is a further feature of this invention to provide a valve protection circuit for a valve controlling the flow of fluid comprising: means having an actuating current and a holding current smaller than said actuating current for actuating the valve; and protective means connected in series with said actuating means and responsive to current flow of the magnitude of the actuating current after a period of time for removing electrical power from the actuating means for a period of time and for reapplying the power to said actuating means.

It is a further feature of the invention to provide a signal light indicating the recycling condition of the solenoid valve.

Further objects and advantages will become apparent from the following detailed description taken in connection with the accompanying drawings in which:

FIG. 1 is a vertical section through the solenoid controlled valve;

FIG. 2 is a fragmentary bottom plan view of the valve shown in FIG. 1; and

FIG. 3 is a circuit including said valve.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

FIGURE 3 generally shows a source of electrical current 10 connected to a function-responsive switch 11 and to a solenoid 12 and, more particularly, the coil of the solenoid. A recycling circuit, indicated generally at 13, completes the electrical circuit for controlling operation of the solenoid 12. Incorporated within the recycling circuit 13 is a heating coil element 14 and a switch 15, series connected, including a normally closed bi-metal switch contact 15a. In parallel with the series circuit is a neon light 16.

The solenoid 12 is shown in FIG. 1 having its core 16a engaging a stem 17 of a valve member 18 controlling a fluid flow to a pair of ports 19 and 20.

In operation, the function-responsive switch 11 actuates the circuit and applies power to solenoid 12. Current flows through the bimetallic switch 15, heating coil element 14, and solenoid 12. The initial flow of current is heavy, this being the operating characteristic of a solenoid, and sufficient flux is developed by the solenoid to actuate core 16a and stem 17 to move the valve member 18 to a control position. When the solenoid actuates valve member 18 to its control position, the inductance of the solenoid has increased so that the current is reduced to a holding current which is an amount smaller than that needed or present to initially or progressively actuate the solenoid to that control position.

The heating coil 14 and switch contact 15a are designed so that the holding current flowing through heating coil 14 is not sufficient to move the the bimetallic switch contact 15a sufficiently to cause it to break the series circuit.

However, in the event that valve member 18 is prevented from completing its travel, current having a burn out value in excess of the holding current flows through the solenoid coil and heating element 14. This will heat bimetallic contact 15a sufficiently after a time interval to cause it to open the series circuit. Thus, the solenoid is de-energized, and it returns to its inactive position. The requirement of a time interval insures that the initial actuation of the solenoid will not open the switch 15. After a predetermined time, the bimetallic contact 15a cools, recloses the switch 15, and reapplies power to the solenoid causing it to attempt to move stem 17. In the event that the reason for the solenoid plunger not completing its travel is removed, such as material particles in the valve, the valve member will be moved to its control position. However, should an obstruction still be sufficient to prevent arriving at the control position, the solenoid will continue to recycle on and off until such time as the obstruction is removed. The light 16, being in parallel with the switch 15, will be lighted to indicate malfunctioning when the switch 15 is open.

The valve generally includes a valve casing 25, first and second end members 26 and 27, and the valve member 18 having the stem 17 and a rod member 29 fitted in end member 27. A conical spring 30 is confined between end member 27 and the valve member 18 for returning the valve member to the left, as viewed in FIG. 1, from the control position when power is removed from solenoid 12.

A plurality of ports and passages 19, 20, 33, 34 and 35 are shown in FIG. 2 and two of which are shown in FIGURE 1, are provided for controlling the flow of a fluid. A plurality of chambers 36, 37, 38, 39 and 40 are provided within the valve body and are in fluid communication with individual ones of the passages. The ports 19 and 20 are the control ports which may be connected to opposite sides of a fluid motor or connected in some other fashion for control. The passage 35 is connected to a source of fluid under pressure and communicates with the central chamber 38 in the valve casing. The passages 33 and 34 communicate with the end chambers 36 and 40 and are suitably connected to tank. The function of the valve member 18 is to connect the pressure passage 35 with one or the other of the ports 19 and 20 and with the other port being connected to tank.

A cover member 50 is provided to close off the end of the valve.

When the valve is in the position shown in FIG. 1, fluid may pass from passage 35 through chamber 38 to chamber 37 and out port 19 to a fluid motor or other device. Fluid may also pass into port 20 through chamber 39 and chamber 40, and out through passage 34 to tank or other connections. When the solenoid is energized by the function-responsive switch 11, stem 17 moves to the right driving the valve member 18 to the right, compressing conical spring 30. Fluid may now flow from passage 35 through chamber 38 to chamber 39 and out port 20 and, in a similar manner, fluid may flow into port 19 to chambers 36 and 37 and out passage 33 to tank. However, in the presence of impurities or dirt in the fluid being controlled, it is possible that the valve member 18 might not be able to complete its movement to the control position. In that event, the heating coil element 14 actuates the bimetallic switch contact 15a to open the circuit and the solenoid is de-energized. Conical spring 30 returns valve member 18 to its leftward position. Upon cooling of the bimetallic switch 15, the solenoid is again energized and the valve member moved to the right. If the impediment to valve travel has been cleared from the valve, the valve member will complete its travel and, if not, the solenoid will be recycled until such time as it is cleared.

It is also possible that an obstruction will hold the valve member 18 in an intermediate position and the solenoid core 16a will be in an intermediate position when the solenoid is de-energized. In this position the amount of power applied by the solenoid, upon re-energization, will be greater than if the solenoid were starting with the ports in initial position. The solenoid 12 operates on alternating current and achieves higher force values as the solenoid core moves into the field of its coil. Subsequent cycles, if the valve member has not returned, will be attempted at force values higher than those normally associated with actuation of the solenoid when in normal initial position. Also, when the valve member 18 is stuck, the force of spring 30 which normally acts in opposition to the solenoid is removed from the system to permit the exertion of even greater effective force by the solenoid on the blocked valve member to attempt removal of the obstruction.

We claim:

1. A solenoid controlled valve including a casing, a valve member movable in said casing to control fluid flow, a solenoid operatively connected to said valve member for moving said valve member to a control position, circuit means for energizing said solenoid, and means including said circuit means and elements in series in said circuit responsive to a continuation of a burn out current value caused by the valve member not reaching a control position after a predetermined time for recycling the solenoid and valve member.

2. A solenoid operated valve comprising a casing, a valve member in said casing, means for moving said valve member to a first position, a circuit including a solenoid operatively associated with said valve member for moving said valve member away from said first position, a normally closed switch in series with said solenoid having a movable bimetallic contact, and a heating coil for said bimetallic element also in series with said solenoid responsive only to a current flow in excess of the holding current for the solenoid to open said switch and de-energize said solenoid, said bimetallic element upon cooling again closing said circuit to again energize said solenoid.

3. A valve as defined in claim 2 in which an indicator light is in said circuit in parallel with said switch and is lighted upon opening of said switch.

4. A solenoid valve protection circuit for use with a valve controlling fluid flow, comprising: valve actuating solenoid means having an actuating current and a holding current smaller than said actuating current; and protective means connected in circuit in series with said solenoid actuating means and responsive to current flow of the magnitude of said actuating current after a period of time but not to said holding current for removing electrical power from said solenoid actuating means for a period of time and for reapplying said power to said actuating means.

5. A solenoid controlled valve comprising, a valve casing, a valve member in said casing having a control position, means for moving said valve member away from the control position, a solenoid operatively associated with the valve member for moving the valve member to the control position, an operating circuit for said solenoid including a switch in series with said solenoid, said switch having a movable bi-metal switch contact urged to a normally closed position, a heating coil in series with said switch responsive only to a current in excess of a solenoid holding current when the valve member does not reach the control position to actuate said bi-metal contact to an open position to open said circuit and de-energize said solenoid, cooling of said coil and said bi-metal contact resulting in closing of said circuit to again energize the solenoid.

6. An electrical circuit having a solenoid including a core and a winding, said solenoid having characteristics whereby a holding current has a certain value with the solenoid core in one position and an actuating current has a greater value with the solenoid core in other positions, and detecting means in said circuit in series with said solenoid winding responsive to said actuating current but not the holding current for detecting location of said core other than at said one position.

7. A solenoid controlled valve including a casing, a valve member movable in said casing to control fluid flow, a solenoid operatively connected to said valve member for moving said valve member to a control position, said solenoid having characteristics whereby a holding current has a certain value with the solenoid core in one position and an actuating current has a greater value with the solenoid core in other positions, circuit means for energizing said solenoid, and means in series with said solenoid responsive to a continuation of the actuating current beyond a predetermined time caused by the valve member not reaching a control position for cutting-off power to the solenoid.

8. A solenoid valve protection circuit for use with a valve controlling fluid flow, comprising: valve actuating solenoid means having an actuating current and a holding current smaller than said actuating current; and protective means connected in circuit in series with said solenoid actuating means and responsive to current flow of the magnitude of said actuating current after a period of time but not to said holding current for removing electrical power from said solenoid actuating means.

References Cited by the Examiner

UNITED STATES PATENTS

| 2,057,384 | 10/36 | Lamb | 317—124 |
| 2,436,992 | 3/48 | Ernst | 251—129 X |
| 2,914,645 | 11/59 | Wallace | 317—132 X |

M. CARY NELSON, *Primary Examiner.*

ISADOR WEIL, *Examiner.*